(12) United States Patent
Irino et al.

(10) Patent No.: US 12,708,973 B2
(45) Date of Patent: Aug. 18, 2026

(54) MACHINE TOOL, METHOD OF ESTIMATING FORCE APPLIED TO TOOL, AND NON-TRANSITORY COMPUTER-READABLE MEDIUM STORING PROGRAM FOR ESTIMATING FORCE APPLIED TO TOOL

(71) Applicant: DMG MORI CO., LTD., Nara (JP)

(72) Inventors: Naruhiro Irino, Nara (JP); Yasuhiro Imabeppu, Nara (JP); Kengo Kawai, Nara (JP); Haythem Boujnah, Nara (JP)

(73) Assignee: DMG MORI CO., LTD., Nara (JP)

( * ) Notice: Subject to any disclaimer, the term of this patent is extended or adjusted under 35 U.S.C. 154(b) by 633 days.

(21) Appl. No.: 18/271,282

(22) PCT Filed: Oct. 8, 2021

(86) PCT No.: PCT/JP2021/037327
§ 371 (c)(1),
(2) Date: Sep. 25, 2023

(87) PCT Pub. No.: WO2022/149322
PCT Pub. Date: Jul. 14, 2022

(65) Prior Publication Data
US 2024/0058915 A1 Feb. 22, 2024

(30) Foreign Application Priority Data
Jan. 7, 2021 (JP) ................................ 2021-001432

(51) Int. Cl.
*B23Q 17/09* (2006.01)

(52) U.S. Cl.
CPC ................................ *B23Q 17/0966* (2013.01)

(58) Field of Classification Search
CPC ................................................ B23Q 17/0966
See application file for complete search history.

(56) References Cited

U.S. PATENT DOCUMENTS

| | | |
|---|---|---|
| 4,802,095 A | 1/1989 | Jeppsson |
| 2016/0045994 A1 | 2/2016 | Jayr et al. |

FOREIGN PATENT DOCUMENTS

| | | |
|---|---|---|
| CN | 103551922 A | 2/2014 |
| EP | 02978565 B1 | 11/2017 |
| JP | H06315853 A | 11/1994 |

OTHER PUBLICATIONS

Denkena et al. "Feeling machines for online detection and compensation of tool deflection in milling" CIRP Annals—Manufacturing Technology 67 (2018) 423-426.

*Primary Examiner* — Nirvana Deonauth
(74) *Attorney, Agent, or Firm* — IP Business Solutions, LLC.

(57) ABSTRACT

There is provided a technique to estimate a cutting force by a new method other than use of a dynamometer. A machine tool capable of cutting a workpiece using a tool includes a first surface that receives a force due to the cutting of the workpiece, the first surface being located in the machine tool; and a second surface that receives a force due to the cutting of the workpiece, the second surface being located in the machine tool. The second surface is not parallel to the first surface, and the machine tool includes: a first strain sensor coupled to the first surface and the second surface; and an estimation unit that estimates a force applied to the tool, based on an output value of the first strain sensor during the cutting of the workpiece.

9 Claims, 12 Drawing Sheets

10
136
W
Y
X
Z
134
132
133
131
112R
M
112Z
M
112Y
M
113
M
112X
111R
SERVO DRIVER
(ROTATION)
111Z
SERVO DRIVER
(Z AXIS DIRECTION)
111Y
SERVO DRIVER
(Y AXIS DIRECTION)
111X
SERVO DRIVER
(X AXIS DIRECTION)
50
CONTROLLER (A)
(B)
LARGE STRAIN
SMALL STRAIN
DIRECTION OF STRAIN
131
140
133B
133
133A
1N
Y
X
Z

OUTPUT VALUE (FROM STRAIN SENSOR 140)
CONTROLLER
50
52
OBTAINMENT UNIT
54
ESTIMATION UNIT
126
CORRELATION
CUTTING FORCE
56
OUTPUT UNIT
CONTROL COMMAND

START
S110
NO
MACHINING PROGRAM EXECUTED?
YES
S112
OBTAIN OUTPUT VALUE OF STRAIN SENSOR
S114
ESTIMATE CUTTING FORCE APPLIED TO TOOL BASED ON OUTPUT VALUE OF STRAIN SENSOR
S120
ESTIMATED CUTTING FORCE MORE THAN PREDETERMINED VALUE?
YES
S122
STOP MACHINING
NO
S130
NO
MACHINING ENDED?
YES
END

SF1
140A
SF2
SF3
140B
SF4
140C
133A
133B
133
Y
Z
X (A)
133
140A
140B
140C
140D
(B)
133
140A
140B
140C
140D
(C)
133
140A
140B
140C
140D
(D)
133
140A
140B
140C
(E)
133
140A
140B
140C
(F)
133
140A
140B
140C
Y
Z
X 10
202
236
Y
X
Z
140
SF1 SF2
231
216
218
223
204
203
210
206
232
221
213
200
201
211

MACHINE TOOL, METHOD OF ESTIMATING FORCE APPLIED TO TOOL, AND NON-TRANSITORY COMPUTER-READABLE MEDIUM STORING PROGRAM FOR ESTIMATING FORCE APPLIED TO TOOL

TECHNICAL FIELD

The present disclosure relates to a technique for estimating a force applied to a tool.

BACKGROUND ART

Techniques have been developed to estimate a force (hereinafter, also referred to as "cutting force") applied to a tool during machining of a workpiece. Regarding such techniques, Japanese Patent Laying-Open No. 06-315853 (PTL 1) discloses a turning machine that estimates a cutting force using a dynamometer. The dynamometer is provided at a turret of the turning machine and detects a cutting force applied to a tool attached to the turret.

CITATION LIST

Patent Literature

PTL 1: Japanese Patent Laying-Open No. 06-315853

SUMMARY OF INVENTION

Technical Problem

Since the dynamometer is expensive, a technique has been desired to estimate a cutting force by a new method other than the use of the dynamometer.

Solution to Problem

In one example of the present disclosure, a machine tool capable of cutting a workpiece using a tool includes: a first surface that receives a force due to the cutting of the workpiece, the first surface being located in the machine tool; and a second surface that receives a force due to the cutting of the workpiece, the second surface being located in the machine tool. The second surface is not parallel to the first surface, and the machine tool includes: a first strain sensor coupled to the first surface and the second surface; and an estimation unit that estimates a force applied to the tool, based on an output value of the first strain sensor during the cutting of the workpiece.

In one example of the present disclosure, the machine tool further includes: a spindle that rotates the tool; and a housing that accommodates the spindle. The first surface is a surface on the housing and forms a predetermined angle with respect to an axis direction of the spindle. The second surface is a surface on the housing and is parallel to the axis direction of the spindle.

In one example of the present disclosure, the machine tool further includes: a spindle that rotates the workpiece; and a cutting tool rest capable of holding the tool that cuts the workpiece. The first surface is a surface on the cutting tool rest and forms a predetermined angle with respect to an axis direction of the spindle. The second surface is a surface on the cutting tool rest or on an installation surface for the cutting tool rest and is parallel to the axis direction of the spindle.

In one example of the present disclosure, the predetermined angle is 90°.

In one example of the present disclosure, the machine tool further includes: a second strain sensor; a third strain sensor; and a fourth strain sensor. The second strain sensor is coupled to the first surface and a third surface that receives a force due to the cutting of the workpiece. The third surface is not parallel to the first surface. The third strain sensor is coupled to the first surface and a fourth surface that receives a force due to the cutting of the workpiece. The fourth surface is not parallel to the first surface and faces the second surface. The fourth strain sensor is coupled to the first surface and a fifth surface that receives a force due to the cutting of the workpiece. The fifth surface is not parallel to the first surface and faces the third surface.

In one example of the present disclosure, the machine tool further includes: a second strain sensor; and a third strain sensor. The second strain sensor is coupled to the first surface and a third surface that receives a force due to the cutting of the workpiece. The third surface is not parallel to the first surface and does not face the second surface. The third strain sensor is coupled to the first surface and a fourth surface that receives a force due to the cutting of the workpiece. The fourth surface is not parallel to the first surface and does not face the second surface and the third surface.

In another example of the present disclosure, there is provided a method of estimating a force applied to a tool when cutting a workpiece in a machine tool. The machine tool includes: a first surface that receives a force due to the cutting of the workpiece, the first surface being located in the machine tool; and a second surface that receives a force due to the cutting of the workpiece, the second surface being located in the machine tool. The second surface is not parallel to the first surface. The machine tool further includes a strain sensor coupled to the first surface and the second surface. The method includes: obtaining an output value of the strain sensor during the cutting of the workpiece; and estimating a force applied to the tool, based on the output value.

In another example of the present disclosure, there is provided a program for estimating a force applied to a tool when cutting a workpiece in a machine tool. The machine tool includes: a first surface that receives a force due to the cutting of the workpiece, the first surface being located in the machine tool; and a second surface that receives a force due to the cutting of the workpiece, the second surface being located in the machine tool. The second surface is not parallel to the first surface. The machine tool further includes a strain sensor coupled to the first surface and the second surface. The program causes the machine tool to perform: obtaining an output value of the strain sensor during the cutting of the workpiece; and estimating a force applied to the tool, based on the output value.

The foregoing and other objects, features, aspects and advantages of the present invention will become more apparent from the following detailed description of the present invention when taken in conjunction with the accompanying drawings.

DESCRIPTION OF EMBODIMENTS

Figure 1:
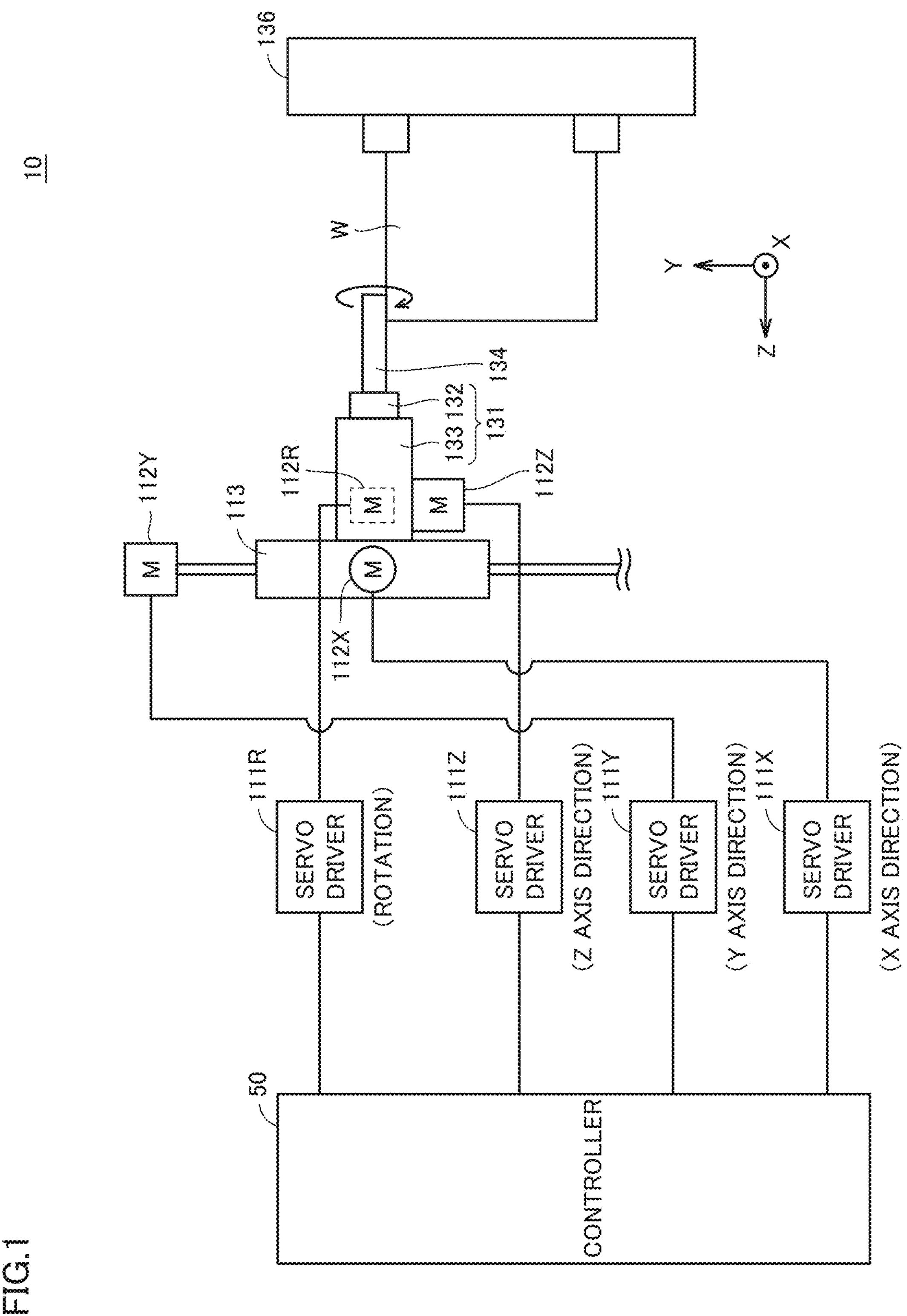
FIG. 1 is a diagram showing an exemplary device configuration of a machine tool.

Hereinafter, embodiments according to the present invention will be described with reference to figures. In the description below, the same parts and components are denoted by the same reference characters. Their names and functions are also the same. Therefore, they will not be described repeatedly in detail. It should be noted that the embodiments and modifications described below may be selectively combined as appropriate.

A. Configuration of Machine Tool 10

First, a device configuration of a machine tool 10 will be described with reference to FIG. 1. FIG. 1 is a diagram showing an exemplary device configuration of machine tool 10.

FIG. 1 shows machine tool 10 serving as a machining center. Machine tool 10 may be a horizontal machining center or a vertical machining center.

Hereinafter, machine tool 10 serving as a machining center will be described, but machine tool 10 is not limited to the machining center. For example, machine tool 10 may be a lathe, an additive processing machine, or another cutting machine or grinding machine.

As shown in FIG. 1, machine tool 10 includes a controller 50, servo drivers 111R, 111X to 111Z, servo motors 112R, 112X to 112Z, a movable body 113, a spindle head 131, a tool 134, and a table 136.

"Controller 50" in the present specification means a device that controls machine tool 10. A device configuration of controller 50 is arbitrary. Controller 50 may be constituted of a single control unit or a plurality of control units. As an example, controller 50 may include an NC (Numerical Control) unit or may include a PLC (Programmable Logic Controller).

Spindle head 131 is constituted of a spindle 132 and a housing 133. Housing 133 accommodates spindle 132. A tool for machining a workpiece W to be machined is attached to spindle 132. In the example of FIG. 1, a tool 134 serving as an end mill is attached to spindle 132.

In the following description, an axis direction of spindle 132 is referred to as a "Z direction", a direction of gravity (i.e., an upward/downward direction in the plane of sheet) is referred to as a "Y direction", and a direction orthogonal to both the Z direction and the Y direction is referred to as an "X direction".

Based on reception of a machining start command, controller 50 starts execution of a machining program prepared in advance, and controls servo drivers 111R, 111X to 111Z in accordance with the machining program, thereby machining workpiece W fixed to table 136. The machining program is described in, for example, an NC program.

Servo driver 111R sequentially receives an input of a target rotation speed from controller 50 and controls servo motor 112R (rotation driving unit). Servo motor 112R drives to rotate spindle 132 about an axis in the Z direction. More specifically, servo driver 111R calculates an actual rotation speed of servo motor 112R in accordance with a feedback signal of an encoder (not shown) that detects a rotation angle of servo motor 112R, and increases the rotation speed of servo motor 112R when the actual rotation speed is less than the target rotation speed, and decreases the rotation speed of servo motor 112R when the actual rotation speed is more than the target rotation speed. Thus, servo driver 111R causes the rotation speed of servo motor 112R to be close to the target rotation speed while sequentially receiving the feedback of the rotation speed of servo motor 112R.

Servo driver 111X sequentially receives an input of a target position from controller 50 and controls servo motor 112X. Servo motor 112X drives to feed, via a ball screw (not shown), movable body 113 to which spindle head 131 is attached, and drives to feed spindle 132 to any position in the X direction. More specifically, servo driver 111X calculates an actual position of movable body 113 from a feedback signal of an encoder (not shown) that detects a rotation angle of servo motor 112X, and servo driver 111X raises the actual position of servo motor 112X when the actual position is less than the target position, and servo driver 111X lowers the actual position of servo motor 112X when the actual position is more than the target position. Thus, servo driver 111X causes the actual position of servo motor 112X to be close to the target position while sequentially receiving feedback of the actual position of servo motor 112X. Thus, servo driver 111X drives to feed spindle 132 to any position in the X direction.

Servo driver 111Y sequentially receives an input of a target position from controller 50 and controls servo motor 112Y. Servo motor 112Y drives to feed, via a ball screw (not shown), movable body 113 to which spindle head 131 is attached, and drives to feed spindle 132 to any position in the Y direction. A method of controlling servo motor 112Y using servo driver 111Y is similar to that using servo driver 111X, and therefore will not be described repeatedly.

Servo driver 111Z sequentially receives an input of a target position from controller 50 and controls servo motor 112Z. Servo motor 112Z drives to feed, via a ball screw (not shown), movable body 113 to which spindle head 131 is attached, and drives to feed spindle 132 to any position in the Z direction. The method of controlling servo motor 112Z using servo driver 111Z is similar to that using servo driver 111X, and therefore will not be described repeatedly.

B. Overview

Next, an overview of a method of estimating a cutting force by machine tool 10 will be described.

Machine tool 10 uses a strain sensor to estimate a cutting force applied to the tool during machining of the workpiece. The strain sensor is a sensor that detects a strain at an attachment portion to which the strain sensor is attached.

The strain represents a degree of deformation of the attachment portion in response to an external force applied to the attachment portion. The strain sensor detects the degree of deformation of the attachment portion as an electric signal. The electric signal is converted into a digital value by an AD (Analog-to-Digital) conversion circuit and is then output to controller 50 of machine tool 10.

The strain sensor is provided to be coupled to first surface and second surface in machine tool 10. Each of the first surface and the second surface is a surface that receives a force during cutting of the workpiece and that constitutes a surface of a member in machine tool 10. The first surface and the second surface are not parallel to each other. In other words, the second surface forms a predetermined angle with respect to the first surface.

The first surface and the second surface may be surfaces on the same member or may be surfaces on different members. Each of the first surface and the second surface may be a flat surface or a curved surface.

When at least one of the first surface and the second surface receives an external force during machining of the workpiece, a relative position of the other of the first surface and the second surface with respect to the one of the first surface and the second surface is changed slightly In response, the strain sensor is strained. The strain sensor outputs an output value corresponding to the degree of strain. On this occasion, as the external force applied to the first surface and the second surface is larger, the degree of strain of the strain sensor becomes larger, with the result that the output value of the strain sensor becomes larger.

Paying attention to this point, machine tool 10 estimates the cutting force applied to the tool based on the output value of the strain sensor during the cutting of the workpiece. Strain sensors are less expensive than other sensors such as a dynamometer. Therefore, the use of the strain sensor leads to reduced cost of machine tool 10 itself. Also, the strain sensor can be attached to any member in machine tool 10 and can readily detect a cutting force applied to the tool during machining.

C. Attachment Position for Strain Sensor

Figure 2:
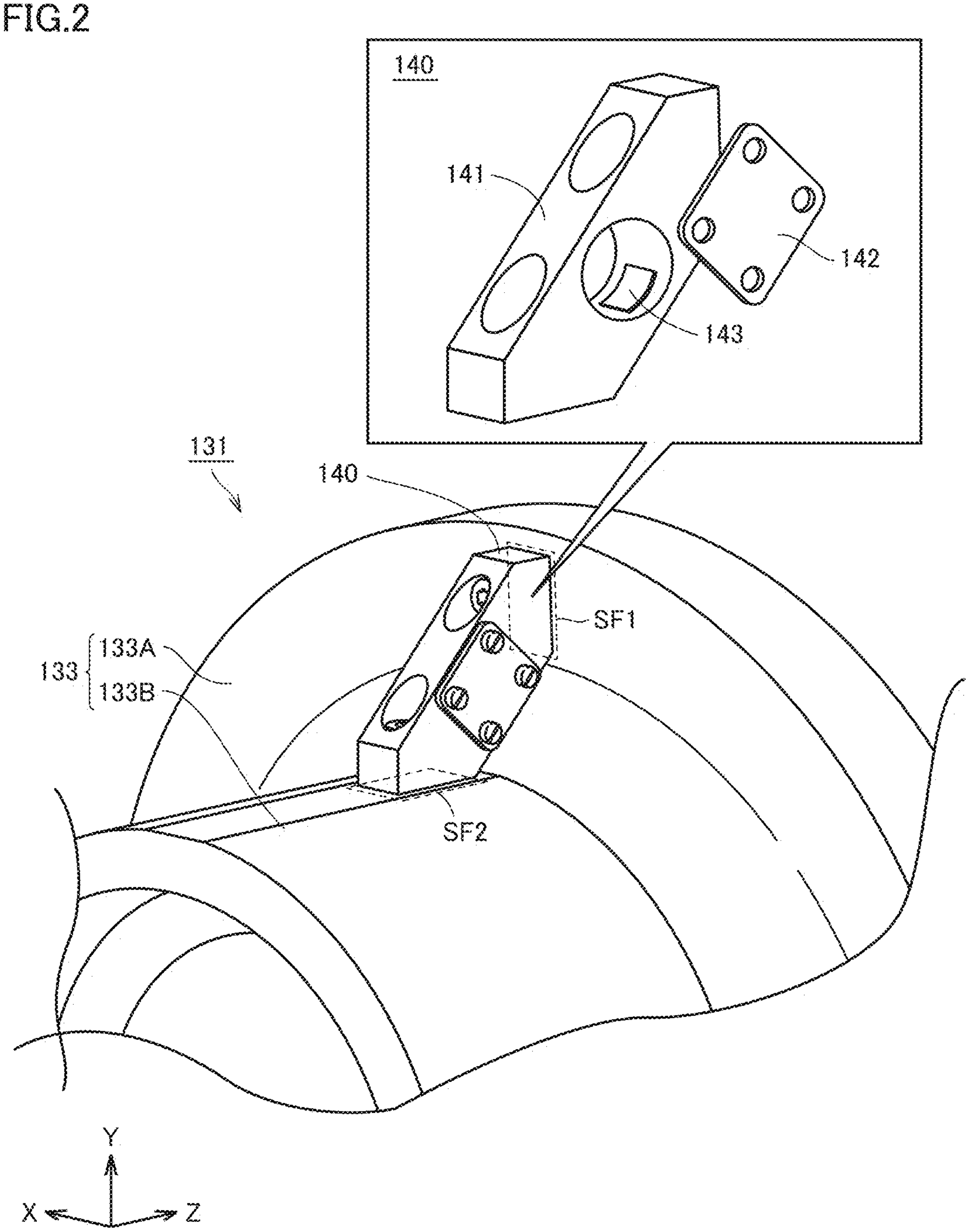
FIG. 2 is a diagram showing a spindle head to which a strain sensor is attached

Next, a specific example of the attachment position for the strain sensor will be described with reference to FIGS. 2 and 3. FIG. 2 is a diagram showing spindle head 131 to which a strain sensor 140 is attached.

Strain sensor 140 is attached to, for example, housing 133 of spindle head 131. Housing 133 is constituted of a flange portion 133A and a cylindrical portion 133B. Flange portion 133A is connected to an end portion of cylindrical portion 133B.

One end of strain sensor 140 is coupled to a surface SF1 (first surface) on flange portion 133A. Surface SF1 is a surface that forms a predetermined angle with respect to the axis direction of spindle 132 (i.e., the Z direction), and is not parallel to the Z direction. Typically, the predetermined angle is about 90°. As an example, surface SF1 is a surface parallel to an XY plane.

On the other hand, the other end of strain sensor 140 is coupled to a surface SF2 (second surface) on cylindrical portion 133B. Surface SF2 is a surface not parallel to surface SF1. In other words, surface SF2 forms a predetermined angle with respect to surface SF1. The predetermined angle is, for example, about 90°. In this case, surface SF2 is orthogonal to surface SF1. As an example, surface SF2 is a surface on housing 133 and is parallel to the axis direction (i.e., the Z direction) of spindle 132.

Strain sensor 140 includes a fixing member 141, a cover 142, and a sensing unit 143. Sensing unit 143 is composed of a metal foil or the like, and detects, as a strain, a change in resistance value due to expansion and contraction of the metal foil. The change in resistance value is output to the controller or the like of machine tool 10 via a conductor wire (not shown) connected to sensing unit 143. Sensing unit 143 is adhered on inside of a hole formed in fixing member 141, and is sealed by cover 142.

Figure 3:
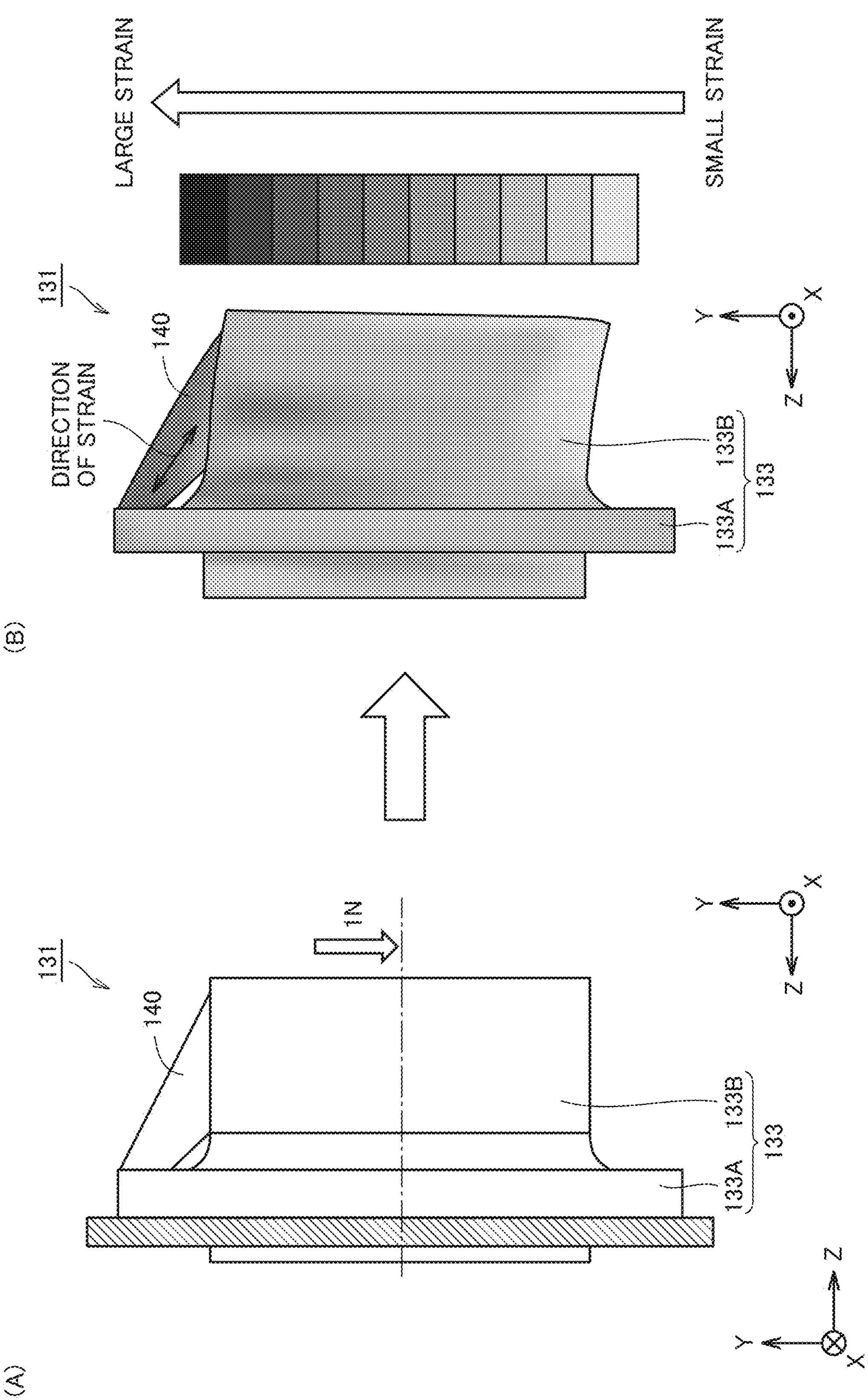
FIG. 3 is a diagram visually showing a degree of strain of the spindle head when an external force is applied to the spindle head.

FIG. 3 is a diagram visually showing a degree of strain of spindle head 131 when an external force is applied to spindle head 131. More specifically, FIG. 3 (A) shows spindle head 131 receiving a force from a positive side to a negative side in the Y direction during machining. FIG. 3 (B) shows a degree of strain of each portion of spindle head 131 in grayscale. It should be noted that for convenience of explanation, FIG. 3 (B) shows that spindle head 131 is in a curved state; however, the degree of curve of spindle head 131 during the machining is actually smaller than that shown in FIG. 3 (B).

As shown in FIG. 3 (B), when spindle head 131 receives a force during the machining, the degree of strain of spindle head 131 is maximum at a connection portion between flange portion 133A and cylindrical portion 133B. Therefore, since strain sensor 140 is coupled to flange portion 133A and cylindrical portion 133B, strain sensor 140 is likely to be affected by the strain of spindle head 131, with the result that strain sensor 140 can detect the force applied to spindle head 131 with high sensitivity.

It has been illustratively described above that strain sensor 140 is attached to spindle head 131; however, the attachment position for strain sensor 140 is not limited to spindle head 131, and strain sensor 140 can be attached on any member that receives a force due to cutting.

Further, it has been illustratively described above that one strain sensor 140 is provided in machine tool 10, however, two or more strain sensors 140 may be provided in machine tool 10.

D. Functional Configuration

Figure 4:
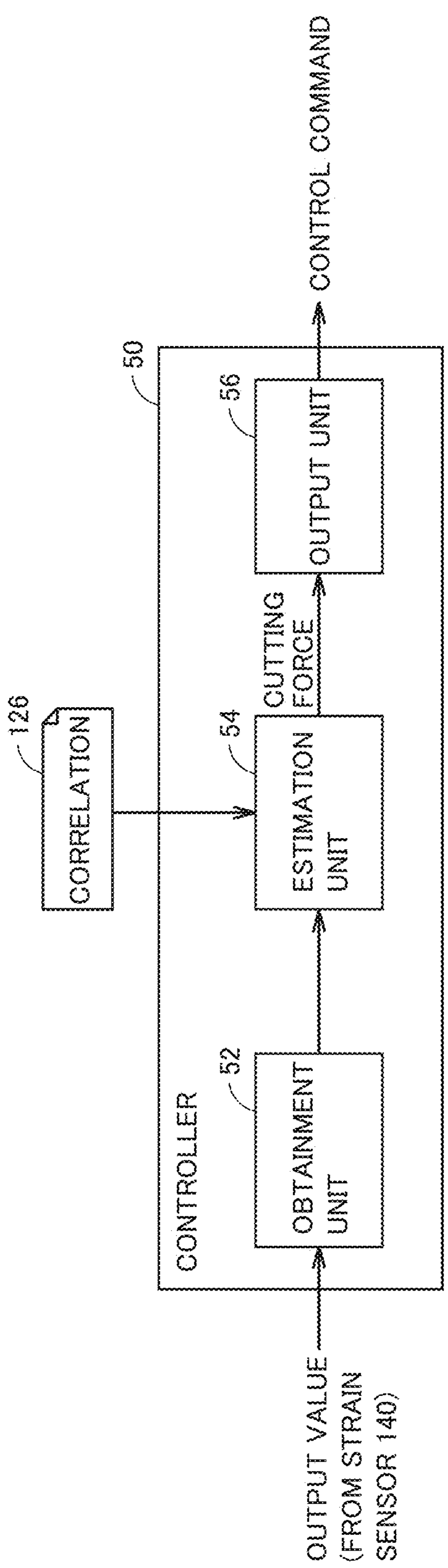
FIG. 4 is a diagram showing an exemplary functional configuration of the machine tool.

Next, a functional configuration for implementing a process of estimating a cutting force will be described with reference to FIG. 4. FIG. 4 is a diagram showing an exemplary functional configuration of machine tool 10.

As shown in FIG. 4, machine tool 10 includes an obtainment unit 52, an estimation unit 54, and an output unit 56 as the functional configuration.

Obtainment unit 52 is a functional module that obtains an output value of strain sensor 140. Obtainment unit 52 sequentially obtains the output value of strain sensor 140 during execution of a machining program. Obtainment unit 52 sequentially outputs the output value of strain sensor 140 to estimation unit 54.

Estimation unit 54 estimates a cutting force from the output value of strain sensor 140 based on a predetermined correlation 126 between the output value of strain sensor 140 and the cutting force. A relation between the output value of the strain sensor and the cutting force in correlation 126 may be defined in the form of a table, or may be defined by a predetermined calculation formula. In this calculation formula, for example, the output value of strain sensor 140 is used as an explanatory variable and the cutting force applied to the tool is used as an objective variable.

Typically, correlation 126 is defined such that as the output value of strain sensor 140 is larger, the cutting force serving as an estimated value is larger. In other words, correlation 126 is defined such that as the output value of strain sensor 140 is smaller, the cutting force serving as the estimated value is smaller.

Output unit 56 outputs, in various manners, the cutting force estimated by estimation unit 54. In a certain aspect, output unit 56 performs a predetermined abnormality handling process based on the estimated cutting force being more than a predetermined value. The abnormality handling process is, for example, a process of outputting a warning to an operator so as to indicate that an excessive force is applied to the tool. A manner of outputting the warning is arbitrary. As an example, the warning may be displayed on a display of machine tool 10, may be output by a sound/voice, or may be output as data in the form of a report.

In another aspect, output unit 56 controls a driving mechanism (for example, servo drivers 111R, 111X, 111Y, 111Z described above) in machine tool 10 based on the estimated cutting force. As an example, output unit 56 stops the driving mechanism in machine tool 10 based on the estimated cutting force being more than a predetermined value. As another example, output unit 56 controls the moving speed of spindle 132, the rotation speed of spindle 132, or the like based on the estimated cutting force.

In another aspect, output unit 56 outputs the estimated cutting force as a log. The log is output in any form. As an example, output unit 56 outputs the log with the estimated cutting force being associated with a time. Thus, an operator can find a cause of abnormality by checking the log.

E. Hardware Configuration of CNC Unit 30

Figure 5:
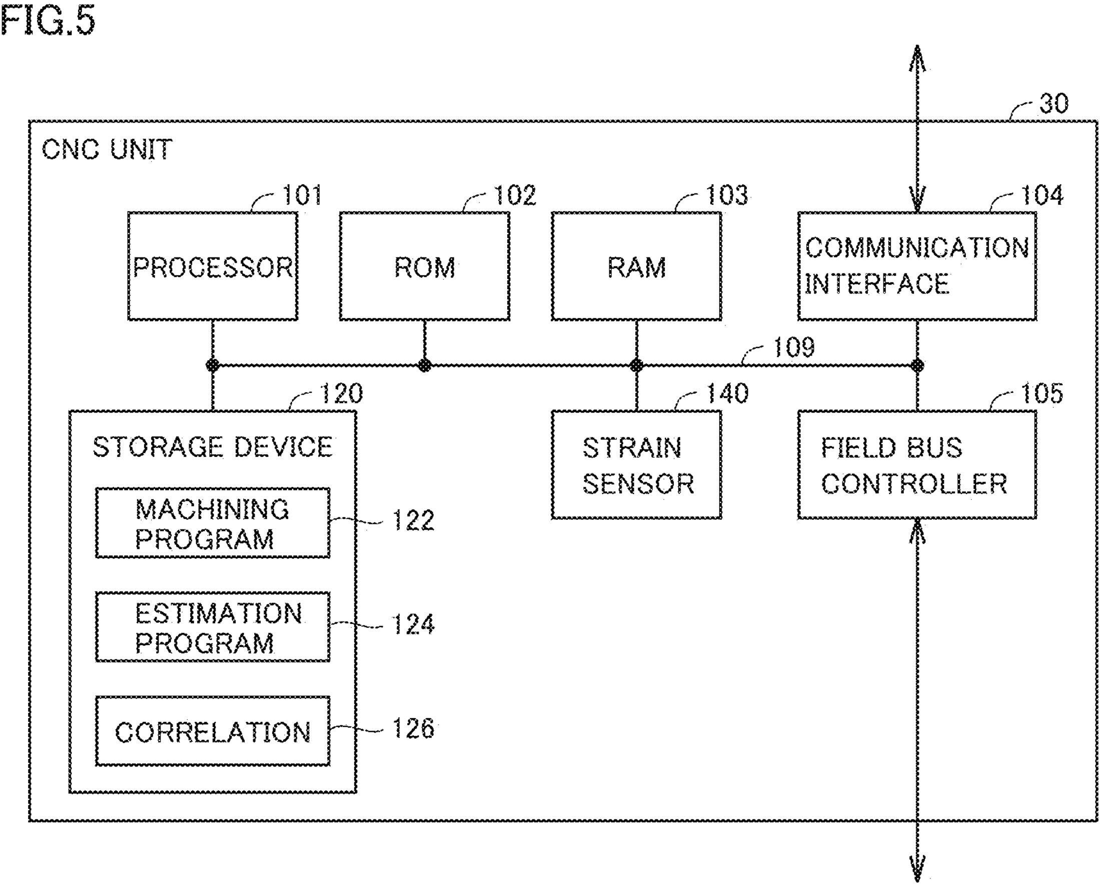
FIG. 5 is a schematic diagram showing an exemplary hardware configuration of a CNC (Computer Numerical Control) unit.

Next, a hardware configuration of CNC unit 30, which is an exemplary controller 50, will be described with reference to FIG. 5. FIG. 5 is a schematic diagram showing an exemplary hardware configuration of CNC unit 30.

CNC unit 30 includes a processor 101, a ROM (Read Only Memory) 102, a RAM (Random Access Memory) 103, a communication interface 104, a field bus controller 105, a storage device 120, and strain sensor 140 described above. These components are connected to an internal bus 109.

Processor 101 is constituted of, for example, at least one integrated circuit. The integrated circuit can be constituted of, for example, at least one CPU (Central Processing Unit), at least one GPU (Graphics Processing Unit), at least one ASIC (Application Specific Integrated Circuit), at least one FPGA (Field Programmable Gate Array), or a combination thereof.

Processor 101 controls operations of CNC unit 30 by executing various programs such as a machining program 122 and an estimation program 124. Based on receipt of an instruction for executing each of the various programs, processor 101 reads the program from storage device 120 or ROM 102 into RAM 103. RAM 103 functions as a working memory and temporarily stores various data necessary for executing the program.

A LAN, an antenna, or the like is connected to communication interface 104. CNC unit 30 exchanges data with an external device (for example, a server) via communication interface 104. CNC unit 30 may be configured to download machining program 122 and estimation program 124 from the external device.

Field bus controller 105 is an interface for implementing communication with various units connected to a field bus. Examples of the units connected to the field bus include a PLC, an I/O unit, and the like.

Storage device 120 is, for example, a storage medium such as a hard disk or a flash memory. Storage device 120 stores machining program 122, estimation program 124, correlation 126 described above, and the like.

Machining program 122 defines various instructions for implementing machining of the workpiece. Estimation program 124 is a program for estimating the cutting force based on the output value of strain sensor 140 and correlation 126 between the output value of strain sensor 140 and the cutting force. The cutting force is referenced, for example, by machining program 122.

A storage location for each of machining program 122, estimation program 124, and correlation 126 is not limited to storage device 120, and they may be stored in a storage area (for example, cache memory) of processor 101, ROM 102, RAM 103, an external device (for example, a server), or the like.

Estimation program 124 may be provided not as a single program but as a part of any program. In this case, the process of estimating the cutting force by estimation program 124 is implemented in cooperation with any program. Even such a program that does not include a part of modules is not deviated from the gist of estimation program 124 according to the present embodiment. Further, part or whole of the functions provided by estimation program 124 may be implemented by dedicated hardware. Further, machine tool 10 may be configured in the form of a so-called cloud service in which at least one server executes part of the process of estimation program 124.

F. Control Flow

Figure 6:
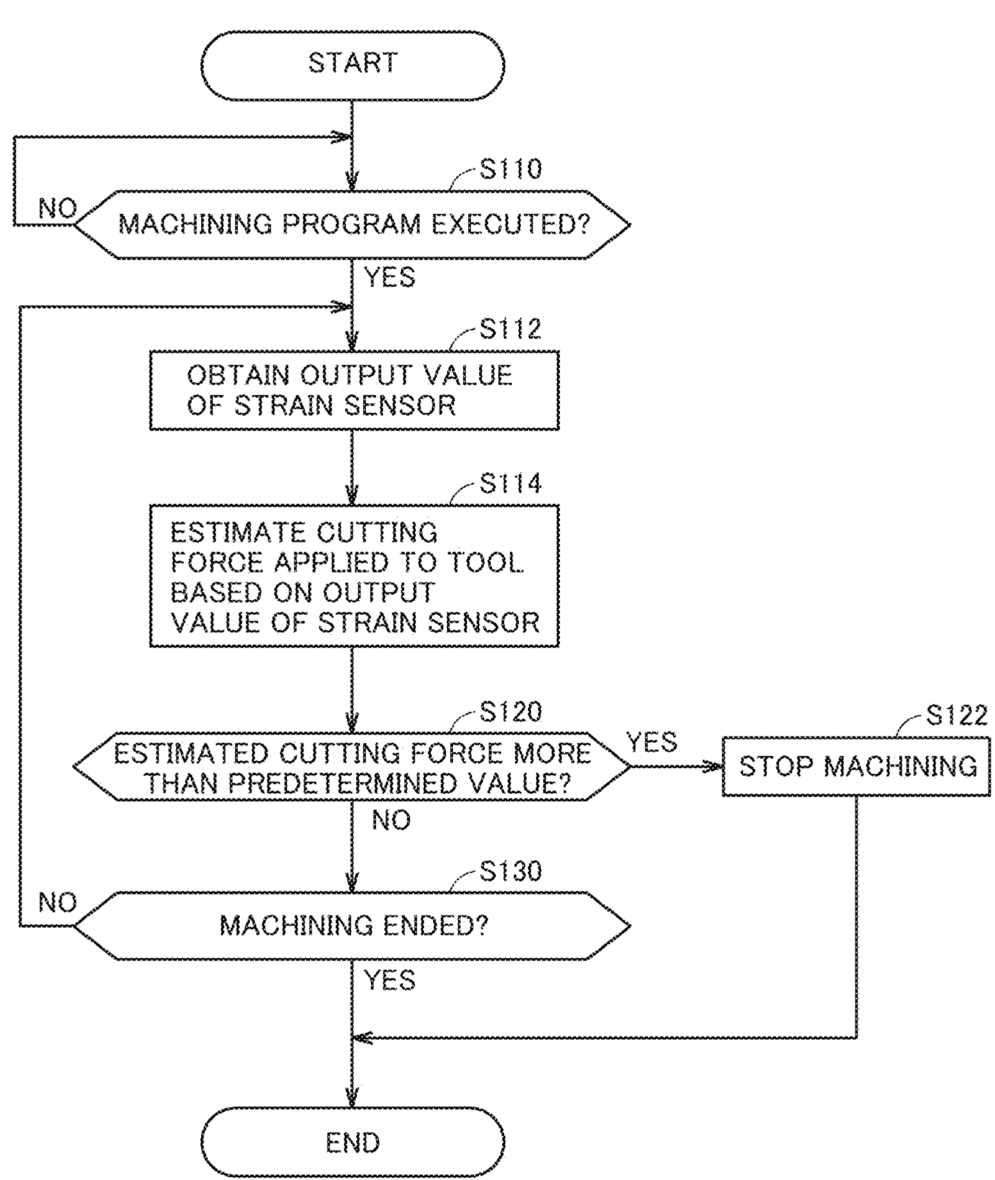
FIG. 6 is a flowchart showing a flow of a process of estimating a cutting force.

Next, a control flow for the process of estimating the cutting force will be described with reference to FIG. 6. FIG. 6 is a flowchart showing a flow of the process of estimating the cutting force.

The process shown in FIG. 6 is implemented by controller 50 executing a control program. In another aspect, part or whole of the process may be performed by a circuit element or other hardware.

In a step S110, controller 50 determines whether or not machining program 122 has been executed. When it is determined that machining program 122 has been executed (YES in step S110), controller 50 switches the control to a step S112. Otherwise (NO in step S110), controller 50 performs the process of step S110 again.

In step S112, controller 50 functions as obtainment unit 52 (see FIG. 4) described above, and obtains the output value of strain sensor 140.

In a step S114, controller 50 functions as estimation unit 54 (see FIG. 4) described above, and estimates the cutting force applied to the tool, based on the output value of strain sensor 140. The method of estimating the cutting force is as described above, and therefore will not be described repeatedly.

In a step S120, controller 50 determines whether or not the cutting force estimated in step S114 is more than a predetermined value. When it is determined that the cutting force is more than the predetermined value (YES in step S120), controller 50 switches the control to a step S122. Otherwise (NO in step S120), controller 50 switches the control to a step S130.

In step S122, controller 50 functions as output unit 56 (see FIG. 4) described above, and outputs a stop command to the driving mechanism (for example, servo drivers 111R, 111X, 111Y, 111Z described above) in machine tool 10. Thus, the machining is stopped.

In step S130, controller 50 determines whether or not the machining is ended. As an example, controller 50 determines that the machining is ended when a stop operation by a user is received, when the machining program is executed up to the final line, or when the machining program is executed a predetermined number of times. When it is determined that the machining is ended (YES in step S130), controller 50 ends the process shown in FIG. 6. Otherwise (NO in step S130), controller 50 returns the control to step S112.

G. Modification 1

Figure 7:
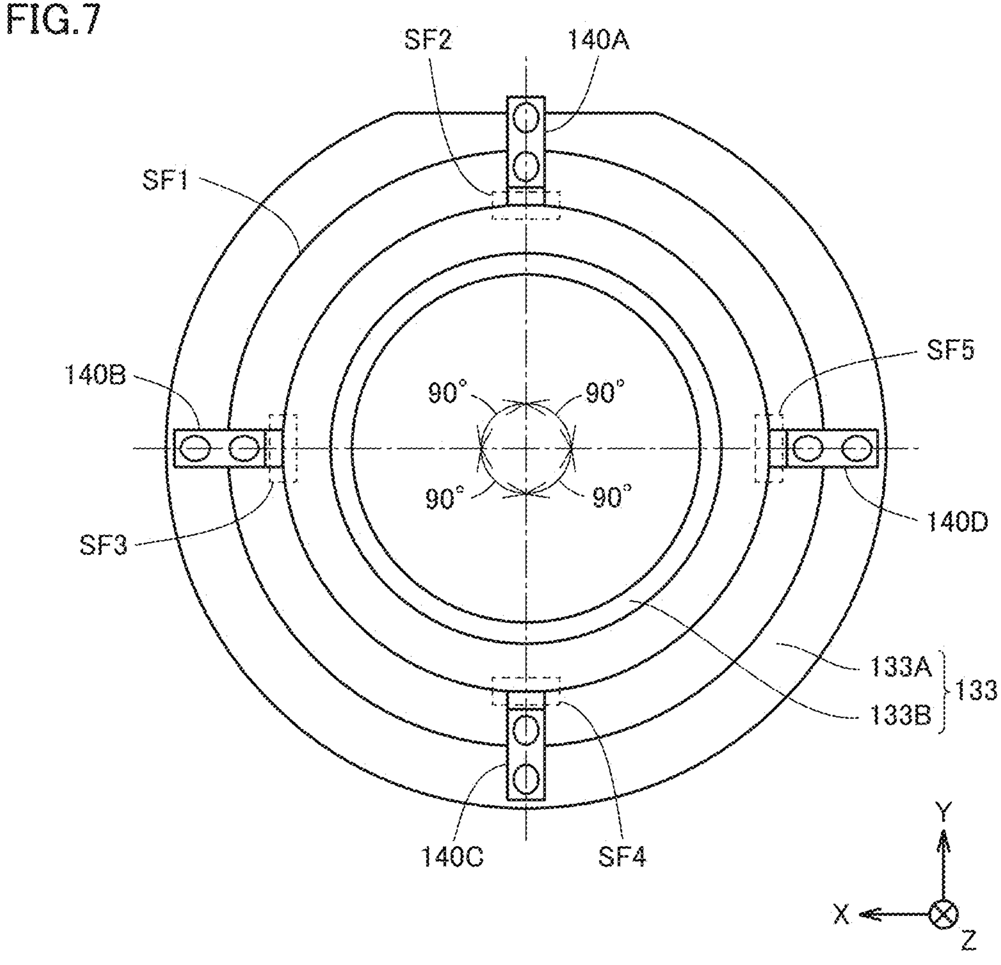
FIG. 7 is a front view showing a housing of the spindle head in a Z direction.
Figure 8:
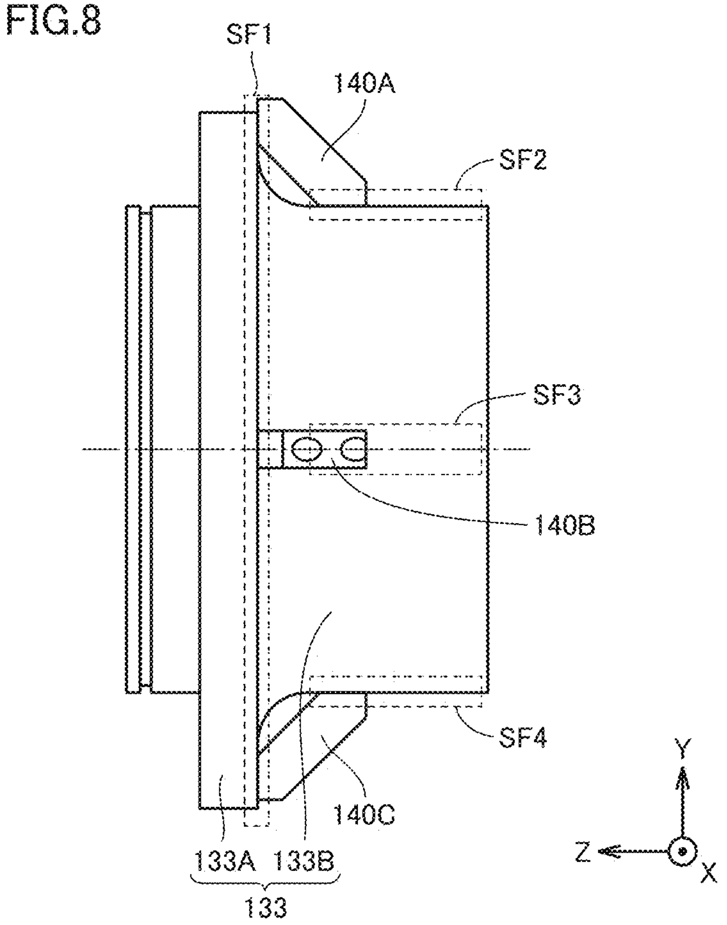
FIG. 8 is a side view showing the housing of the spindle head in an X direction.

Next, a machine tool 10 according to a modification 1 will be described with reference to FIGS. 7 and 8 FIG. 7 is a front view showing housing 133 of spindle head 131 in the Z direction. FIG. 8 is a side view showing housing 133 of spindle head 131 in the X direction.

In the foregoing machine tool 10, one strain sensor 140 is provided at housing 133. On the other hand, in machine tool 10 according to the present modification, four strain sensors 140A to 140D are provided at housing 133. Each of strain sensors 140A to 140D is the same sensor as strain sensor 140 described above.

As described above, housing 133 of spindle head 131 is constituted of flange portion 133A and cylindrical portion 133B. Flange portion 133A is connected to an end portion of cylindrical portion 133B.

Flange portion 133A includes surface SF1 that receives a force from the workpiece during machining. Surface SF1 is a surface connected to flange portion 133A, and is parallel to the XY plane.

Cylindrical portion 133B includes surfaces SF2 to SF5 that each receive a force from the workpiece during machining. Each of surfaces SF2 to SF5 constitutes part of the outer surface of cylindrical portion 133B and is parallel to the axis direction (i.e., the Z direction) of spindle 132.

Surface SF2 is a surface not parallel to surface SF1. In other words, surface SF2 forms a predetermined angle with respect to surface SF1. The predetermined angle is, for example, about 90°. In this case, surface SF2 is orthogonal to surface SF1.

Surface SF3 is a surface not parallel to surface SF1. In other words, surface SF3 forms a predetermined angle with respect to surface SF1. The predetermined angle is, for example, about 90°. When viewed in the axis direction (i.e., the Z direction) of spindle 132, an angle is about 900 between a direction from the rotation center of spindle 132 toward the center of surface SF3 and a direction from the rotation center of spindle 132 toward the center of surface SF2.

Surface SF4 is a surface not parallel to surface SF1. In other words, surface SF4 forms a predetermined angle with respect to surface SF1. The predetermined angle is, for example, about 90°. Surface SF4 faces surface SF2. More specifically, when viewed in the axis direction (i.e., the Z direction) of spindle 132, an angle of about 180° is formed by a direction from the rotation center of spindle 132 toward the center of surface SF4 and a direction from the rotation center of spindle 132 toward the center of surface SF2.

Surface SF5 is not a surface parallel to surface SF1. In other words, surface SF5 forms a predetermined angle with respect to surface SF1. The predetermined angle is, for example, about 90°. Surface SF5 faces surface SF3. More specifically, when viewed in the axis direction (i.e., the Z direction) of spindle 132, an angle of about 180° is formed by a direction from the rotation center of spindle 132 toward the center of surface SF5 and a direction from the rotation center of spindle 132 toward the center of surface SF3.

One end of strain sensor 140A is coupled to surface SF1, and the other end of strain sensor 140A is coupled to surface SF2. One end of strain sensor 140B is coupled to surface SF1, and the other end of strain sensor 140B is coupled to surface SF3. One end of strain sensor 140C is coupled to surface SF1, and the other end of strain sensor 140C is coupled to surface SF4. One end of strain sensor 140D is coupled to surface SF1, and the other end of strain sensor 140D is coupled to surface SF5. As a result, as shown in FIGS. 7 and 8, strain sensors 140A to 140D are provided at equal intervals of 90° when viewed from the axial center of spindle 132.

Machine tool 10 estimates the cutting force in each of the X, Y, and Z directions based on the output values of strain sensors 140A to 140D. The cutting force in each direction is estimated, for example, based on the following formula (1):

$$F=M\cdot S \tag{1}$$

"F" shown in the formula (1) is a vector having cutting forces ($F_x$, $F_y$, $F_z$) in the X, Y and Z directions as components. "S" is a vector having the output values ($S_A$, $S_B$, $S_C$, $S_D$) of strain sensors 140A to 140D as components. "M" is a matrix constituted of a fixed value. The value of "M" is determined in advance at the time of designing of machine tool 10 based on a positional relation among strain sensors 140A to 140D, and the like.

H. Modification 2

Figure 9:
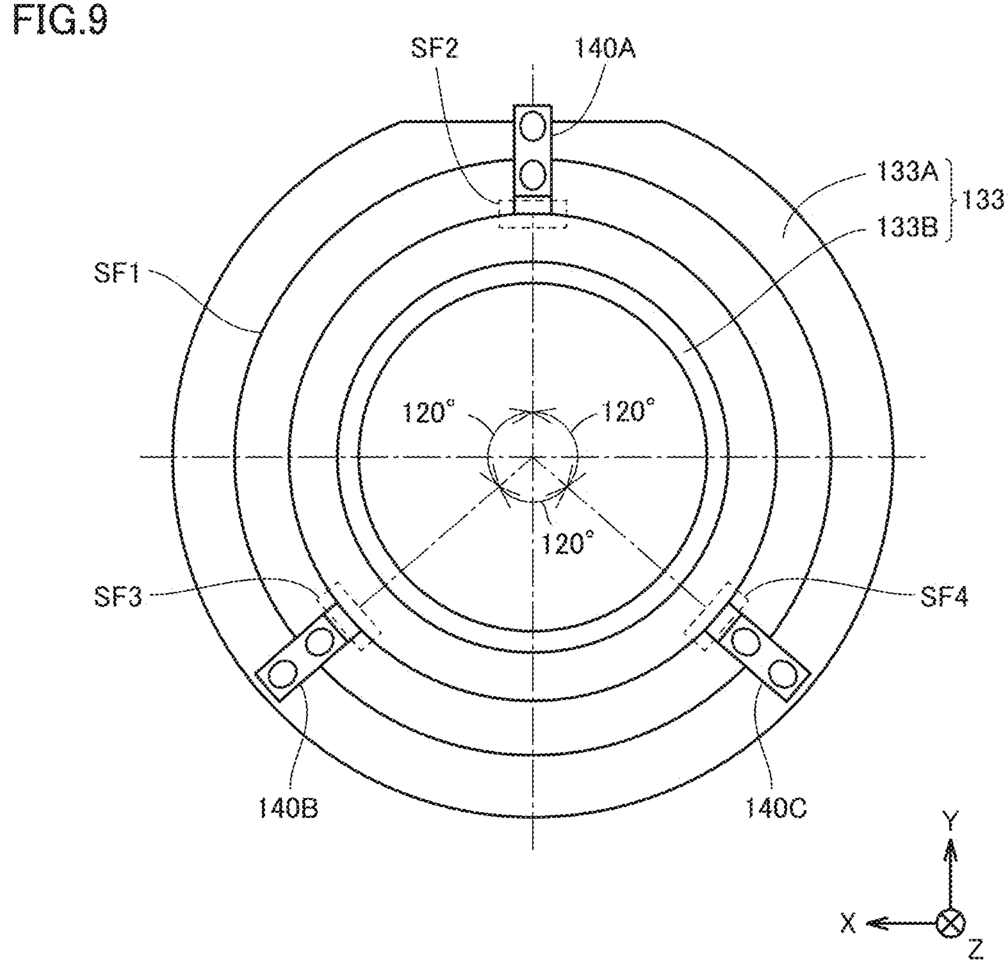
FIG. 9 is a front view showing the housing of the spindle head in the Z direction.
Figure 10:
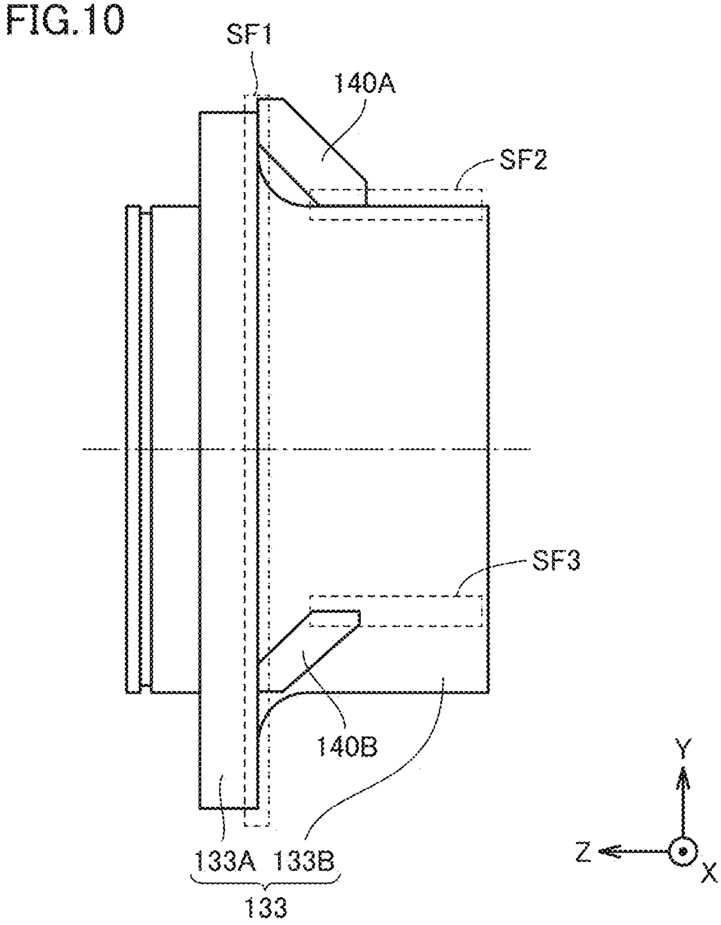
FIG. 10 is a side view showing the housing of the spindle head in the X direction.

Next, a machine tool 10 according to a modification 2 will be described with reference to FIGS. 9 and 10. FIG. 9 is a front view showing housing 133 of spindle head 131 in the Z direction. FIG. 10 is a side view showing housing 133 of spindle head 131 in the X direction.

In machine tool 10 according to modification 1, four strain sensors 140A to 140D are provided at housing 133. On the other hand, in machine tool 10 according to the present modification, three strain sensors 140A to 140C are provided at housing 133.

As described above, housing 133 of spindle head 131 is constituted of flange portion 133A and cylindrical portion 133B. Flange portion 133A is connected to an end portion of cylindrical portion 133B.

Flange portion 133A includes surface SF1 that receives a force from the workpiece during machining. Surface SF1 is a surface connected to flange portion 133A, and is parallel to the XY plane.

Cylindrical portion 133B includes surfaces SF2 to SF4 that each receive a force from the workpiece during machining. Each of surfaces SF2 to SF4 constitutes part of the outer surface of cylindrical portion 133B and is parallel to the axis direction (i.e., the Z direction) of spindle 132.

Surface SF2 is a surface not parallel to surface SF1. In other words, surface SF2 forms a predetermined angle with respect to surface SF1. The predetermined angle is, for example, about 90°. In this case, surface SF2 is orthogonal to surface SF1.

Surface SF3 is a surface not parallel to surface SF1. In other words, surface SF3 forms a predetermined angle with respect to surface SF1. The predetermined angle is, for example, about 90°. Surface SF3 does not face surface SF2. As an example, when viewed in the axis direction (i.e., the Z direction) of spindle 132, an angle is about 120° between a direction from the rotation center of spindle 132 toward the center of surface SF3 and a direction from the rotation center of spindle 132 toward the center of surface SF2.

Surface SF4 is a surface not parallel to surface SF1. In other words, surface SF4 forms a predetermined angle with respect to surface SF1 The predetermined angle is, for example, about 90°. Surface SF4 does not face both surface SF2 and surface SF3. More specifically, when viewed in the axis direction (i.e., the Z direction) of spindle 132, an angle of about 120° is formed by a direction from the rotation center of spindle 132 toward the center of surface SF4 and a direction from the rotation center of spindle 132 toward the center of surface SF2.

One end of strain sensor 140A is coupled to surface SF1, and the other end of strain sensor 140A is coupled to surface SF2. One end of strain sensor 140B is coupled to surface SF1, and the other end of strain sensor 140B is coupled to surface SF3. One end of strain sensor 140C is coupled to surface SF1, and the other end of strain sensor 140C is coupled to surface SF4. As a result, as shown in FIGS. 9 and 10, strain sensors 140A to 140C are provided at equal intervals of 120° when viewed from the axial center of spindle 132.

Machine tool 10 estimates the cutting force in each of the X, Y and Z directions based on the output values of strain sensors 140A to 140C. The cutting force in each direction is estimated, for example, based on the following formula (2):

$$F=M\cdot S \quad (2)$$

"F" shown in the formula (2) is a vector having cutting forces ($F_x$, $F_y$, $F_z$) in the X, Y and Z directions as components. "S" is a vector having the output values ($S_A$, $S_B$, $S_C$) of strain sensors 140A to 140C as components. "M" is a matrix constituted of a fixed value. The value of "M" is determined in advance at the time of designing of machine tool 10 based on a positional relation among strain sensors 140A to 140C, and the like.

I. Modification 3

Figure 11:
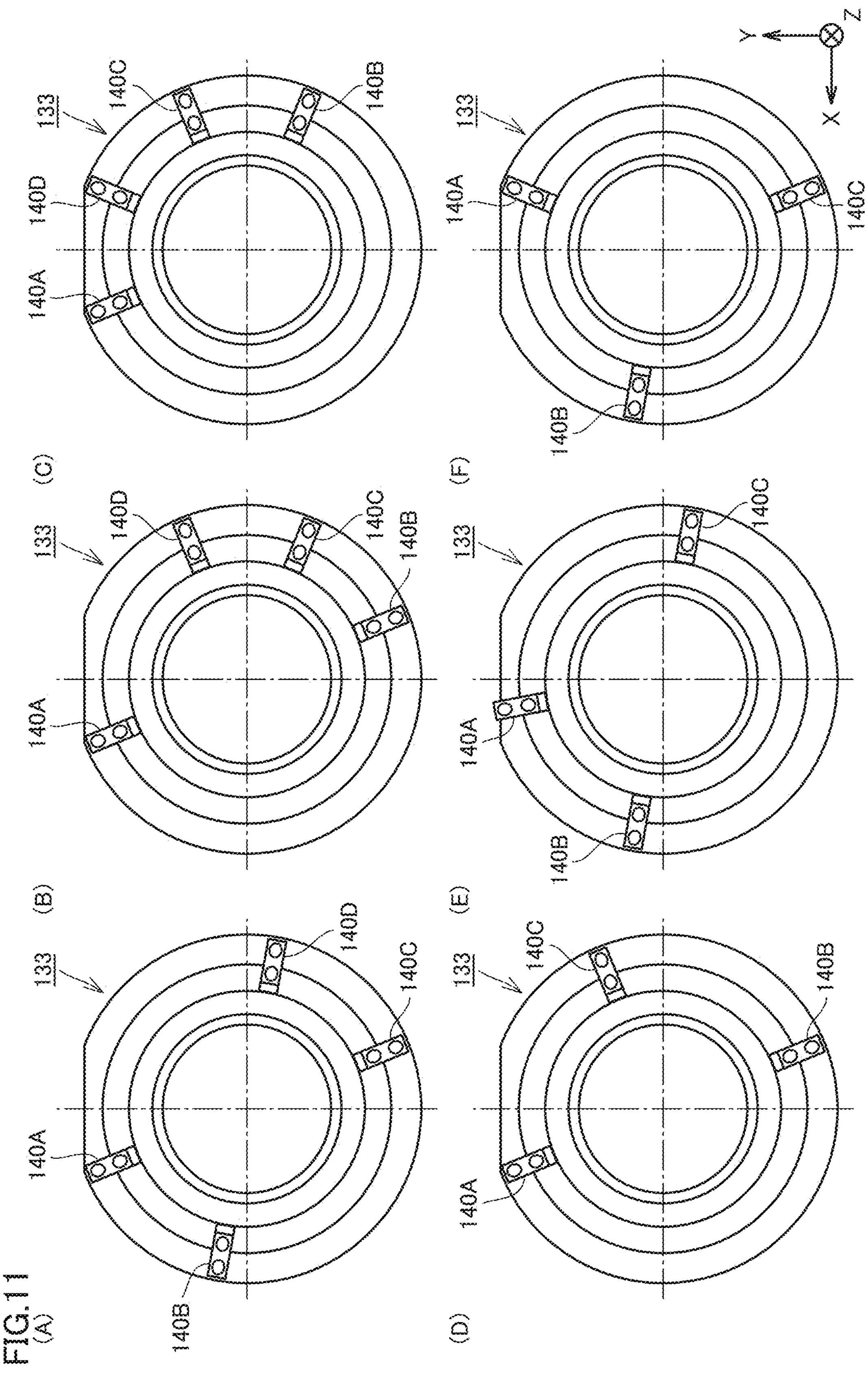
FIG. 11 is a diagram showing various arrangement patterns of strain sensors.

Next, another example of an arrangement pattern of strain sensors 140 will be described with reference to FIG. 11. FIG. 11 is a diagram showing various arrangement patterns of strain sensors 140. In FIG. 11, patterns (A) to (F) are shown as the arrangement patterns of strain sensors 140.

In the example of FIGS. 7 and 8, strain sensors 140A to 140D are arranged at intervals of 90° when viewed in the axis direction of spindle 132; however, strain sensors 140A to 140D may be arranged as shown in the patterns (A) to (C).

In the example of FIGS. 9 and 10, strain sensors 140A to 140C are arranged at intervals of 120° when viewed in the axis direction of spindle 132; however, strain sensors 140A to 140C may be arranged as shown in the patterns (D) and (E). Strain sensors 140A to 140C may be arranged as shown in the pattern (F) of FIG. 11.

J. Modification 4

Figure 12:
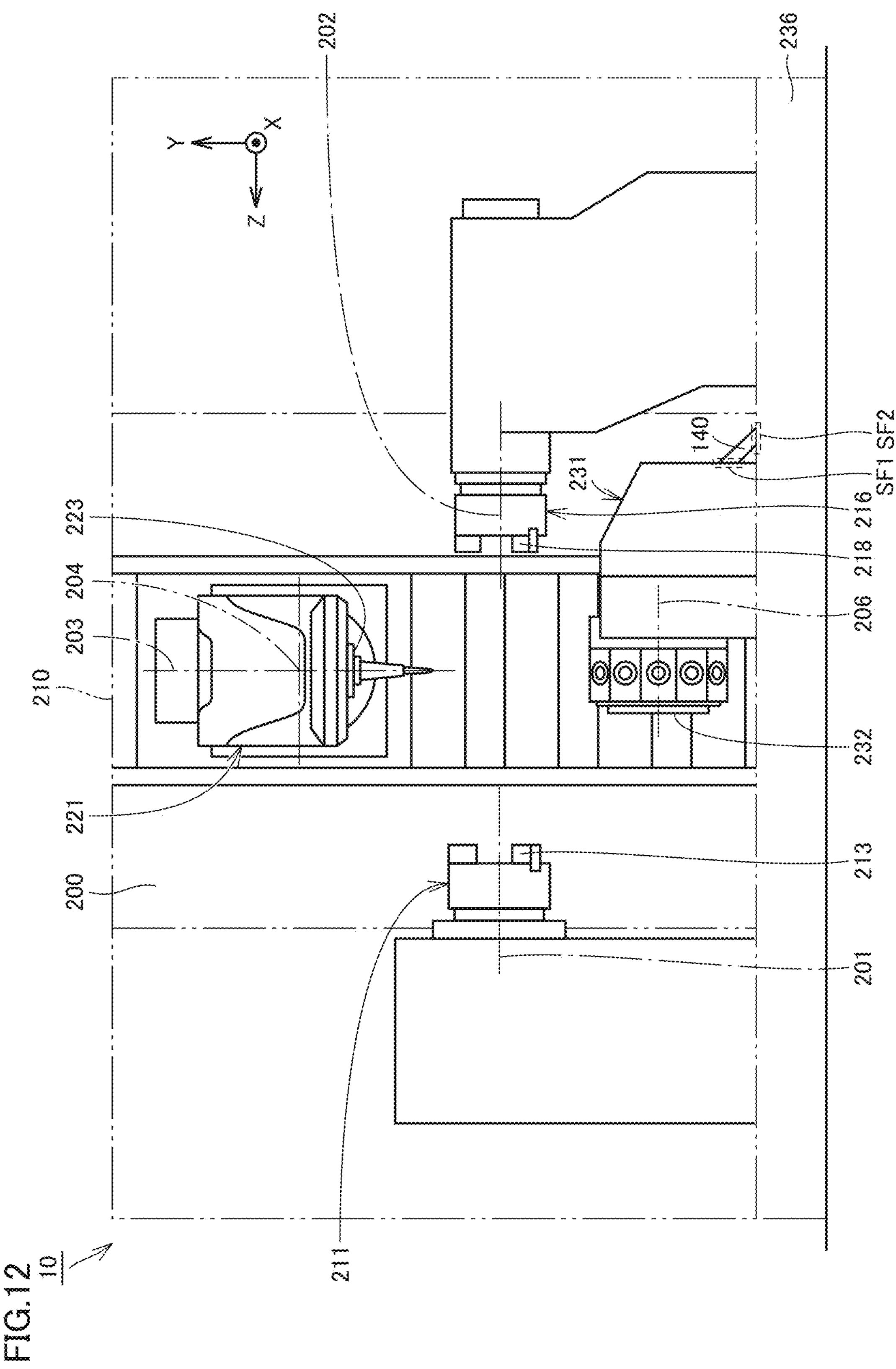
FIG. 12 is a diagram showing a machine tool according to a modification.

Next, a machine tool 10 according to a modification 4 will be described with reference to FIG. 12. FIG. 12 is a diagram showing machine tool 10 according to modification 4.

Machine tool 10 according to the present modification is a combined machine having: a turning function of machining a workpiece, which is being rotated, by bringing a tool into contact with the workpiece; and a milling function of machining a workpiece by bringing a tool, which is being rotated, into contact with the workpiece.

As shown in FIG. 12, machine tool 10 has a bed 236, a workpiece spindle 211, an opposing workpiece spindle 216, a tool spindle 221, and a cutting tool rest 231.

Bed 236 is a base member that supports workpiece spindle 211, opposing workpiece spindle 216, tool spindle 221, cutting tool rest 231, and the like, and is installed on a floor surface of a factory or the like. Bed 236 is composed of a metal such as cast iron.

Each of workpiece spindle 211 and opposing workpiece spindle 216 is configured to hold a workpiece. Workpiece spindle 211 and opposing workpiece spindle 216 are provided opposite to each other in the Z axis direction. Workpiece spindle 211 and opposing workpiece spindle 216 are mainly provided to rotate the workpiece during turning using a fixed tool. Workpiece spindle 211 is provided to be rotatable about a center axis 201 parallel to the Z axis. Opposing workpiece spindle 216 is provided to be rotatable about a center axis 202 parallel to the Z axis. Workpiece spindle 211 and opposing workpiece spindle 216 are respectively provided with a first chuck mechanism 213 and a second chuck mechanism 218 so as to detachably grasp the workpiece.

Workpiece spindle 211 is fixed on bed 236. Opposing workpiece spindle 216 is provided to be movable in the Z axis direction by various types of feeding mechanisms, guide mechanisms, servo motors, and the like.

Each of tool spindle 221 and cutting tool rest 231 is configured to hold a tool to cut a workpiece. Tool spindle 221 is provided above cutting tool rest 231.

Tool spindle 221 is rotatable about a center axis 203 extending in the vertical direction and parallel to the Y axis. Tool spindle 221 is provided with a clamp mechanism (not shown) that detachably holds the tool.

Further, tool spindle 221 is provided to extend in the horizontal direction and to be pivotable about a center axis 204 parallel to the X axis orthogonal to the Z axis direction (B-axis pivoting). A range of the pivoting of tool spindle 221 is, for example, a range of ±120° with respect to a posture (posture shown in FIG. 12) in which spindle end surface 223 of tool spindle 221 faces downward.

Tool spindle 221 is supported on bed 236 by a column (not shown) or the like. Tool spindle 221 is provided to be movable in the Y axis direction, the X axis direction, and the Z axis direction by various types of feeding mechanisms, guide mechanisms, servo motors, and the like provided at the column or the like.

Cutting tool rest 231 has a so-called turret shape, a plurality of tools are attached thereto radially and cutting tool rest 231 performs turning indexing machining.

More specifically, cutting tool rest 231 has a pivotable portion 232. Pivotable portion 232 is provided to be pivotable about a center axis 206 parallel to the Z axis. Tool holders for holding tools are attached to positions at intervals in a peripheral direction with respect to center axis 206. When pivotable portion 232 is pivoted about center axis 206, the tools held by the tool holders are moved in the peripheral direction, thereby determining a tool to be used to machine the workpiece.

Cutting tool rest 231 is supported on bed 236 by a saddle (not shown) or the like. Cutting tool rest 231 is provided to be movable in the Y axis direction and the Z axis direction by various types of feeding mechanisms, guide mechanisms, servo motors, and the like provided at the saddle or the like. It should be noted that cutting tool rest 231 may be provided to be movable in the Z axis direction and an oblique upward/downward direction that is orthogonal to the Z axis direction and that includes a vertical component. In this case, cutting tool rest 231 may be configured to be simultaneously fed in the Y axis direction and the X axis direction, thereby moving in the oblique upward/downward direction that is orthogonal to the Z axis direction and that includes the vertical component.

A rotary tool or a fixed tool may be held by each of tool spindle 221 and cutting tool rest 231. The rotary tool is a tool that machines a workpiece while being rotated, such as a drill, an end mill, a reamer, or the like. When the rotary tool is held at cutting tool rest 231, cutting tool rest 231 includes: a motor that outputs rotation; and a motive power transmission mechanism that transmits, to the rotary tool, the rotation output from the motor.

Machine tool 10 further has a splash guard 210. Splash guard 210 forms an external appearance of machine tool 10 and defines and forms a machining area 200 for the workpiece.

Machine tool 10 uses strain sensor 140 provided on cutting tool rest 231 so as to estimate the cutting force applied to the tool. One end of strain sensor 140 is coupled to surface SF1 (first surface). Surface SF1 is a surface on cutting tool rest 231 and forms a predetermined angle with respect to the axis direction (i.e., the Z direction) of tool spindle 221. Typically, the predetermined angle is about 90°. As an example, surface SF1 is a surface parallel to the XY plane.

On the other hand, the other end of strain sensor 140 is coupled to surface SF2 (second surface). Surface SF2 is a surface not parallel to surface SF1. In other words, surface SF2 forms a predetermined angle with respect to surface SF1. The predetermined angle is, for example, about 90°. As an example, surface SF2 is a surface on cutting tool rest 231 and is parallel to the axis direction (i.e., the Z direction) of tool spindle 221. Alternatively, surface SF2 is a surface on an installation surface (i.e., on bed 236) for cutting tool rest 231 and is parallel to the axis direction of tool spindle 221. Typically, surface SF2 is orthogonal to surface SF1.

Strain sensor 140 detects the degree of strain of cutting tool rest 231 during machining. Machine tool 10 estimates the cutting force from the output value of strain sensor 140 based on the predetermined correlation between the output value of strain sensor 140 and the cutting force. The relation between the output value of the strain sensor and the cutting force in the correlation may be defined in the form of a table, or may be defined by a predetermined calculation formula. In this calculation formula, for example, the output value of strain sensor 140 is used as an explanatory variable, and the cutting force applied to the tool is used as an objective variable.

K. Conclusion

As described above, strain sensor 140 is coupled to surfaces SF1, SF2 that each receive an external force during machining. Surface SF1 and surface SF2 form a predetermined angle. When surface SF1 and surface SF2 receive an external force, relative positions of surface SF1 and surface SF2 are changed slightly, with the result that strain sensor 140 is strained accordingly. As the external force received by the tool is larger, the degree of strain of strain sensor 140 is larger, with the result that the output value of strain sensor 140 becomes large. Thus, the output value of strain sensor 140 is correlated with the cutting force applied to the tool. Hence, machine tool 10 can estimate the cutting force applied to the tool, based on the output value of strain sensor 140. Such a strain sensor is less expensive than other sensors such as a dynamometer. Therefore, the use of the strain sensor leads to reduced cost of machine tool 10 itself.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

10: machine tool; 30: CNC unit; 50: controller; 52: obtainment unit; 54: estimation unit; 56: output unit; 101: processor, 102: ROM; 103: RAM; 104: communication interface; 105: field bus controller; 109: internal bus; 111R, 111X, 111Y, 111Z: servo driver; 112R, 112X, 112Y, 112Z: servo motor, 113: movable body; 120: storage device; 122: machining program; 124: estimation program; 126: correlation; 131: spindle head; 132: spindle; 133: housing; 133A: flange portion; 133B: cylindrical portion; 134: tool; 136: table; 140, 140A, 140B, 140C, 140D: strain sensor; 141: fixing member, 142: cover; 143: sensing unit; 200: machining area; 201, 202, 203, 204, 206: center axis; 210: splash guard; 211: workpiece spindle; 213: first chuck mechanism; 216: opposing workpiece spindle, 218 second chuck mechanism; 221: tool spindle, 223: spindle end surface, 231: cutting tool rest; 232: pivotable portion; 236: bed.

The invention claimed is:

1. A machine tool capable of cutting a workpiece using a tool, the machine tool comprising:

a first surface that receives a force due to the cutting of the workpiece, the first surface being located in the machine tool;

a second surface that receives a force due to the cutting of the workpiece, the second surface being located in the machine tool, the second surface being not parallel to the first surface;

a first strain sensor coupled to the first surface and the second surface; and an estimation unit that estimates a force applied to the tool, based on an output value of the first strain sensor during the cutting of the workpiece, wherein the first strain sensor has a first end in direct contact with the first surface and a second end in direct contact with the second surface, the first strain sensor has a shape not in direct contact with a connection portion constituted of the first surface and the second surface due to a gap located between an inner side surface of the first strain sensor and the connection portion.

2. The machine tool according to claim 1, wherein the first strain sensor includes a fixing member coupled to the first surface and the second surface, and a sensing unit attached to a hole provided in the fixing member.

3. The machine tool according to claim 1, further comprising:

a spindle that rotates the tool; and a housing that accommodates the spindle, wherein the first surface is a surface on the housing and forms a predetermined angle with respect to an axis direction of the spindle, and the second surface is a surface on the housing and is parallel to the axis direction of the spindle.

4. The machine tool according to claim 1, further comprising:

a spindle that rotates the workpiece; and a cutting tool rest capable of holding the tool that cuts the workpiece, wherein the first surface is a surface on the cutting tool rest and forms a predetermined angle with respect to an axis direction of the spindle, and the second surface is a surface on the cutting tool rest or a surface on an installation surface for the cutting tool rest and is parallel to the axis direction of the spindle.

5. The machine tool according to claim 3, wherein the predetermined angle is 90°.

6. The machine tool according to claim 5, further comprising:

a second strain sensor;

a third strain sensor; and a fourth strain sensor, wherein the second strain sensor is coupled to the first surface and a third surface that receives a force due to the cutting of the workpiece, and the third surface is not parallel to the first surface, the third strain sensor is coupled to the first surface and a fourth surface that receives a force due to the cutting of the workpiece, and the fourth surface is not parallel to the first surface and faces the second surface, and the fourth strain sensor is coupled to the first surface and a fifth surface that receives a force due to the cutting of the workpiece, and the fifth surface is not parallel to the first surface and faces the third surface.

7. The machine tool according to claim 5, further comprising:

a second strain sensor; and a third strain sensor, wherein the second strain sensor is coupled to the first surface and a third surface that receives a force due to the cutting of the workpiece, and the third surface is not parallel to the first surface and does not face the second surface, and the third strain sensor is coupled to the first surface and a fourth surface that receives a force due to the cutting of the workpiece, and the fourth surface is not parallel to the first surface and does not face the second surface and the third surface.

8. A method of estimating a force applied to a tool when cutting a workpiece in a machine tool, the machine tool including a first surface that receives a force due to the cutting of the workpiece, the first surface being located in the machine tool, a second surface that receives a force due to the cutting of the workpiece, the second surface being located in the machine tool, the second surface being not parallel to the first surface, and a strain sensor coupled to the first surface and the second surface, wherein the strain sensor has a first end in direct contact with the first surface and a second end in direction contact with the second surface, the strain sensor has a shape not in direct contact with a connection portion constituted of the first surface and the second surface due to a gap located between an inner side surface of the first strain sensor and the connection portion, the method comprising obtaining an output value of the strain sensor during the cutting of the workpiece; and estimating a force applied to the tool, based on the output value.

9. A non-transitory computer-readable medium storing a program for estimating a force applied to a tool when cutting a workpiece in a machine tool, the machine tool including a first surface that receives a force due to the cutting of the workpiece, the first surface being located in the machine tool, a second surface that receives a force due to the cutting of the workpiece, the second surface being located in the machine tool, the second surface being not parallel to the first surface, and a strain sensor coupled to the first surface and the second surface, wherein the strain sensor has a first end in direct contact with the first surface and a second end in direction contact with the second surface, the strain sensor has a shape not in direct contact with a connection portion constituted of the first surface and the second surface due to a gap located between an inner side surface of the first strain sensor and the connection portion, the program causing the machine tool to perform:

obtaining an output value of the strain sensor during the cutting of the workpiece; and estimating a force applied to the tool, based on the output value.

* * * * *